June 16, 1931.  E. M. ANDRES  1,810,334
GRAPHIC CHART
Filed Nov. 26, 1928
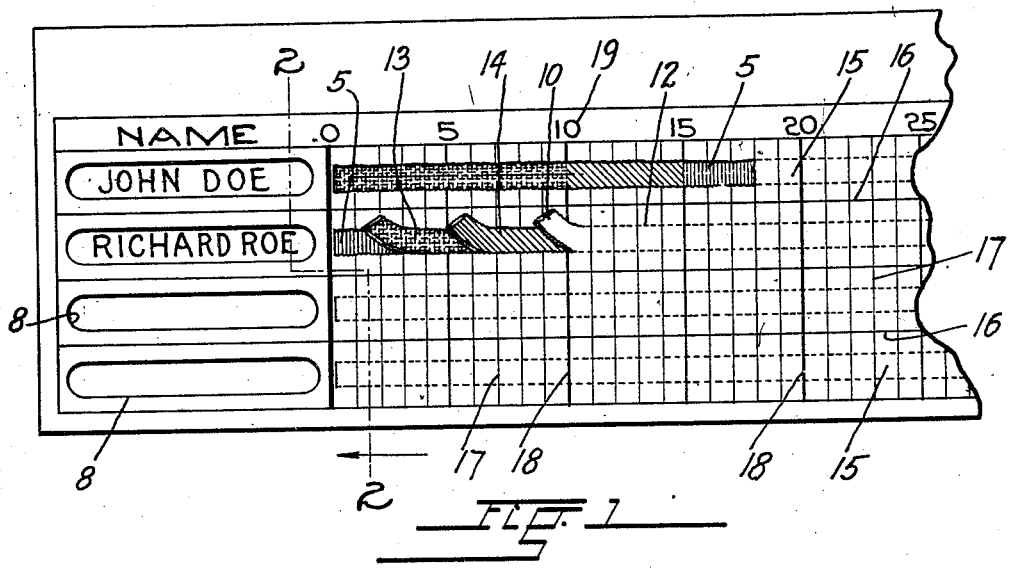
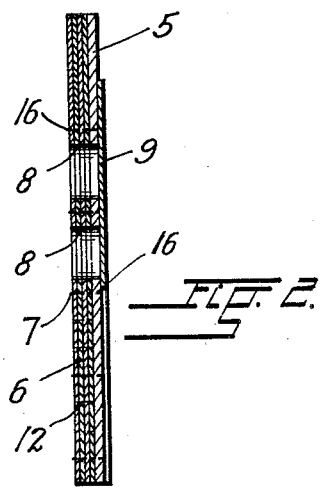
INVENTOR.
E. M. ANDRES
ATTORNEY.

Patented June 16, 1931

1,810,334

UNITED STATES PATENT OFFICE

EDWARD M. ANDRES, OF PHOENIX, ARIZONA, ASSIGNOR OF ONE-HALF TO RUSSELL W. TALLMAN, OF GUNNISON, COLORADO

GRAPHIC CHART

Application filed November 26, 1928. Serial No. 321,931.

My invention relates to graphic charts that are readily changeable to keep abreast of varying conditions. The principal object of the invention is to provide a chart of the character described that will indicate various conditions for a single individual, machine, group, or other unit.

Another object is to provide a multi-ply chart in which each ply is of a different color.

Other objects reside in details of construction and in novel combinations and arrangements of parts, as will more fully appear in the course of the following description.

In the drawings, in which like parts are designated by the same characters in the several views, Figure 1 is a face view of a chart embodying the foregoing objects.

Figure 2 is an enlarged section taken on the line 2—2 of Figure 1.

Referring more specifically to the drawings, the reference numeral 5 designates the back or base member of the chart, having some degree of stiffness to lend body to the chart.

Mounted on the base member are a number of sheets 6, preferably of lighter paper than the base. It is preferred that each sheet be a different color or marked differently to distinguish them one from the others. The sheets 6 may be attached to the base member by any suitable means. Stitching is shown at 7 on the drawings, but any other desirable means may be employed.

Windows 8 are provided in the chart and may consist of registering apertures in the base member 5 and the sheets 6. A name sheet 9 is then attached to the rear of the base member in any suitable manner, as by gluing, whereby names thereon may be seen through the windows.

Opposite to and alined with the windows are well defined, removable strips 10 on the sheets 6, between weakened lines 12. When the sheets 6 are attached to the base 5 by stitching, the stitches may be used to create the weakened lines and thus define the removable strips, although it is preferred to effect the weakened lines by perforation of the sheets.

In the drawings the base member 5 has been shown as being red. A black sheet 13 is next to the base, a green sheet 14 is disposed on the black one, and a white sheet 15 is on top. Of course any combination of colors may be used, or the sheets may be otherwise distinguishable as by different marking, such as shading.

The white or top sheet may be ruled longitudinally and transversely, as shown at 16 and 17 respectively. The transverse ruling may be divided into columns by heavier ruling, as indicated at 18, and the columns may bear progressive indicatory means 19, if desired. The arrangement and choice of matter on the top sheet may be infinitely varied according to the needs and desires of the users.

The chart herein described has a great many uses, and claim is made to all such uses, whether known or unknown. It is valuable in business, shops, schools, contests, etc.

The use of the invention will be concretely illustrated by describing one of its many uses.

In using the chart for a budget system, the names of the persons placed in the budget are shown through the windows 8. The removable strip on the top or white sheet is peeled back and removed according to the amount of money that can be spent by the first individual, for example. This exposes a green strip, which represents the amount that may be expended. As this money is being used up, the green strip is correspondingly removed, exposing the black. After all of the exposed green strip is removed, which means that the allotted portion of the budget has been expended, the white, green and black strips are all removed for additional expenditures, which exposes the red base member, showing that that individual is "in the red", because he is exceeding his budget.

The distinct advantage of the present chart is that a series of things may be indicated for each individual and still is compact and easily understood.

What I claim and desire to secure by Letters Patent is:

1. A chart comprising a plurality of sheets having markings and having superposed, removable strips between weakened lines, and means to fasten the sheets together at opposite sides of the removable strips.

2. A chart comprising a plurality of sheets having superposed, differently colored, removable strips between weakened lines, and means to fasten the sheets together at opposite sides of the removable strips.

3. A chart comprising a plurality of superposed sheets having markings, the sheets having alined removable strips and the sheets being fastened together at opposite sides of the removable strips.

4. A chart comprising a plurality of superposed sheets having differently-colored, removable strips, the sheets being fastened together at opposite sides of the removable strips.

5. A chart comprising a plurality of sheets having markings, and stitching fastening the sheets together, the superposed sheets having removable strips between the stitching.

6. A chart comprising a plurality of differently colored sheets and stitching fastening the sheets together, the superposed sheets having removable strips between the stitching.

7. A chart comprising a plurality of sheets having markings, the superposed sheets having removable strips, the chart having indicia opposite the removable strips.

8. A chart comprising a plurality of sheets having markings, the sheets having removable strips, and the top sheet having graduations transverse to the strips and providing spaces between the graduations.

9. A chart comprising a plurality of superposed sheets having differently-shaded, removable strips, the sheets being fastened together at each side of the removable strips.

In testimony whereof I have affixed my signature.

EDWARD M. ANDRES.